(12) United States Patent
Tai et al.

(10) Patent No.: US 9,976,707 B2
(45) Date of Patent: May 22, 2018

(54) COLOR MIXING OUTPUT FOR HIGH BRIGHTNESS LED SOURCES

(71) Applicant: PHILIPS LIGHTING HOLDING B.V., Eindhoven (NL)

(72) Inventors: Kuochou Tai, Eindhoven (NL); Jeffrey Dellert Kmetec, Eindhoven (NL); Gregory Guth, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/109,236

(22) PCT Filed: Dec. 19, 2014

(86) PCT No.: PCT/IB2014/067107
§ 371 (c)(1),
(2) Date: Jun. 30, 2016

(87) PCT Pub. No.: WO2015/104608
PCT Pub. Date: Jul. 16, 2015

(65) Prior Publication Data
US 2016/0320002 A1 Nov. 3, 2016

Related U.S. Application Data

(60) Provisional application No. 61/924,744, filed on Jan. 8, 2014.

(51) Int. Cl.
*F21V 7/06* (2006.01)
*F21K 9/62* (2016.01)
*G02B 6/42* (2006.01)
*F21V 8/00* (2006.01)
(Continued)

(52) U.S. Cl.
CPC ............ *F21K 9/62* (2016.08); *F21K 9/61* (2016.08); *F21V 7/0091* (2013.01); *F21V 7/06* (2013.01);
(Continued)

(58) Field of Classification Search
CPC . F21K 9/62; F21K 9/61; F21V 7/0091; F21V 7/06; G02B 6/0031; G02B 6/0096; G02B 6/4214; G02B 27/0994
(Continued)

(56) References Cited

U.S. PATENT DOCUMENTS 3,859,536 A 1/1975 Thiel
7,573,073 B2 8/2009 Leatherdale et al.
(Continued)

FOREIGN PATENT DOCUMENTS

EP 1503434 A2 2/2005
EP 2296025 A2 3/2011

*Primary Examiner* — Paultep Savusdiphol
(74) *Attorney, Agent, or Firm* — Akarsh P. Belagodu (57) ABSTRACT

A mixing optic combines a variety of features to enhance the brightness and uniformity of the light emitted from a combination of different color light emitting sources. The mixing optic may include a parabolic reflector that redirects low-angle emissions, a reflective waveguide that mixes the light spatially, and a diffuser plate that mixes the light angularly. In an embodiment, the output of the mixing optic exhibits a substantially Lambertian output pattern of a substantially uniform mix of colors, exhibiting, for example, the light output pattern of a single white light source.

15 Claims, 5 Drawing Sheets

(51) Int. Cl.
  *G02B 27/09*  (2006.01)
  *F21K 9/61*  (2016.01)
  *F21V 7/00*  (2006.01)
  *F21Y 115/10*  (2016.01)

(52) U.S. Cl.
  CPC ......... *G02B 6/0001* (2013.01); *G02B 6/0031* (2013.01); *G02B 6/0096* (2013.01); *G02B 6/4214* (2013.01); *G02B 27/0994* (2013.01); *F21Y 2115/10* (2016.08)

(58) Field of Classification Search
  USPC .......................................... 362/296.08, 311.07
  See application file for complete search history.

(56) References Cited

U.S. PATENT DOCUMENTS

| | | | |
|---|---|---|---|
| 2004/0008952 A1 | 1/2004 | Kragl | |
| 2006/0203468 A1* | 9/2006 | Beeson | G02B 27/286 362/84 |
| 2007/0263383 A1* | 11/2007 | Ansems | G02B 6/0068 362/231 |
| 2008/0062686 A1* | 3/2008 | Hoelen | G02B 6/002 362/240 |
| 2009/0122533 A1 | 5/2009 | Brukilacchio | |
| 2009/0262517 A1 | 10/2009 | Suehiro et al. | |
| 2010/0188018 A1 | 7/2010 | Salm | |
| 2011/0170286 A1* | 7/2011 | Tessnow | F21V 7/0083 362/235 |
| 2012/0069547 A1 | 3/2012 | Ansems et al. | |
| 2012/0099308 A1 | 4/2012 | Brukilacchio | |
| 2012/0274203 A1 | 11/2012 | Yokotani | |
| 2013/0208495 A1* | 8/2013 | Dau | F21V 7/0008 362/551 |
| 2013/0265561 A1* | 10/2013 | Takahira | F21V 7/06 356/3 |
| 2015/0241024 A1* | 8/2015 | Smith | F21K 9/233 362/296.07 |

* cited by examiner

[PRIOR ART]

COLOR MIXING OUTPUT FOR HIGH BRIGHTNESS LED SOURCES

CROSS-REFERENCE TO PRIOR APPLICATIONS

This application is the U.S. National Phase application under 35 U.S.C. § 371 of International Application No. PCT/IB2014/067107, filed on Dec. 19, 2014, which claims the benefit of U.S. Provisional Patent Application No. 61/924,744, filed on Jan. 8, 2014. These applications are hereby incorporated by reference herein.

FIELD OF THE INVENTION

This invention relates to the field of light emitting devices, and in particular to an optical element that efficiently mixes the colors from multiple light sources to produce a substantially uniform programmable color output with Lambertian characteristics.

BACKGROUND OF THE INVENTION

Figure 1A:
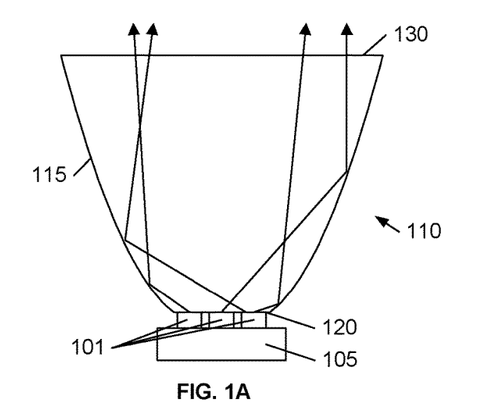
FIGS. 1A and 1B illustrate a conventional parabolic reflector used for providing collimated light from a mix of different color light emitting sources.
Figure 1B:
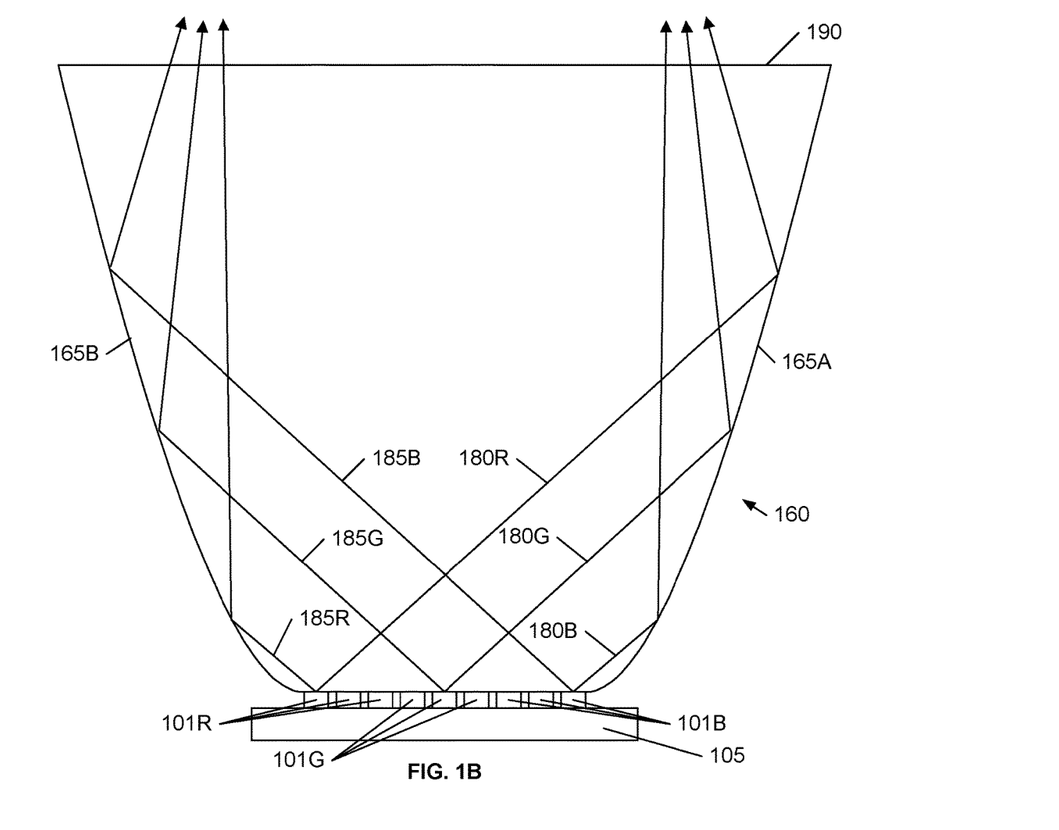

Optics for combining the light output from multiple light sources are common in the art, particularly for directional illumination, as illustrated in FIGS. 1A and 1B.

FIG. 1A illustrates the use of a compound parabolic reflector 110 that receives the light output from multiple light sources 101 via a light input surface 120 and emits the composite light from a light emitting surface 130. The light sources 101 may be mounted on a submount 105.

The side surfaces 115 of the parabolic reflector 110 may be coated with a reflective coating, or the light guide 110 may be encased in a second reflective material, or a material with an index of refraction that facilitates reflection by total internal reflection.

The light output patterns of conventional light sources 101 generally exhibit a Lambertian light output pattern, emitting substantially the same amount of light in each angular direction from the light emitting surface. Light that is emitted at near-orthogonal angles (not illustrated) from the light emitting surfaces of the light sources 101 may be emitted from the light exit surface 130 of the light guide directly, without reflection within the light guide 110. A substantial portion of the light emitted from the light emitting surfaces, on the other hand, will be emitted from the light exit surface 130 after one or more reflections at the side surfaces 115 of the light guide 110, as illustrated.

Because the surfaces 115 of the tapered light guide 110 are at an angle that is not orthogonal to the light emitting surfaces of the light sources 101, the angle at which the light is reflected from the surface, relative to the surfaces of the light sources 101, is closer to the orthogonal than the angle at which the light was emitted from the light sources 101. With each reflection from the sloped surfaces 115, the angle of reflection, relative to the light emitting surfaces, continues to become closer to the orthogonal. Accordingly, the light output from the exit surface 130 is more collimated than the light emitted from the surfaces of the light sources 101.

The curvature of the surfaces 115 is designed such that light at any angle coming from a point source at the center of the light guide 110 will be reflected in the orthogonal direction relative to the light emitting surface. That is, the tangent to the curve at each point on the surface 115 is at an angle relative to the surface of 90-A/2 degrees, where A is the angle from the point source to that point. If the light source were, in fact, a point source at the center of the light guide 110, all of the light reflected from the surfaces 115 would be reflected in the same direction, orthogonal to the surface, producing a highly directional light output from the light guide 110.

In an actual embodiment of a light source such as a semiconductor light emitting device, the light is emitted from the light emitting surface area of the light source, rather than an ideal single point in the center of the light guide 110. Light that is emitted from locations on the surfaces of the light sources 101 that are not at the center of the light guide will not strike the surface 115 at the proper point for being reflected orthogonal to the surface, resulting in a light output pattern that is less collimated than the light output from a single point in the center of the light guide 110.

Accordingly, a design goal for applications requiring a highly directional light output is to minimize the surface area of the light source to more closely resemble a point source. However, the amount of light that can be emitted by a semiconductor light emitting device is dependent upon the light emitting surface area of the device, and, in general, the greater the light emitting surface area, the greater the intensity (or brightness) of the light output. To achieve a light output that is very bright, and suitable for directional lighting, multiple light emitting devices are densely situated in the center of the light guide that serves to collimate the light output.

In some embodiments, the curvature of the surfaces 115 is modified so as not to 'favor' light that is emitted from the center of the light guide 110. That is, the curvature may be such that light emitted from the center of the light guide 110 is reflected at an angle that is not orthogonal, while light emitted from off-center locations are reflected at a more orthogonal angle. However, regardless of the modifications to the light guide, the light output from a light guide that receives light from a surface area will be less collimated than the light output from a light guide that receives light from a point source.

In most situations, particularly when the maximum deviation from the center of the light guide 110 is small, the lack of perfect collimation does not introduce adverse effects, other than producing a light output pattern having a wider beamwidth than the ideal. Consider, however, the effects when the surface area of the combined light sources 101 is large, and when the different color light sources 101 are not randomly distributed on the substrate 105.

FIG. 1B illustrates an example light guide 160 that is designed to accommodate a large number of light sources, 101R, 101G, and 101B, representing red, green, and blue light sources, respectively. For a variety of manufacturing reasons, arrays of multicolor light emitting devices are typically arranged in banks of each color on a substrate 105. In this example, a 9×9 array of light sources is arranged with a 3×9 bank of red light sources 101R, a 3×9 bank of green light sources 101G, and a 3×9 bank of blue light sources 101B.

Three light beams 180R, 180G, and 180B are illustrated as being emitted from a red light source 101R, a green light source 101G, and a blue light source 101B. Each of these beams 180R, 180G, 180B are emitted at the same angle relative to the surfaces of the light sources 101R, 101G, and 101B. In this example, the curvature of the side surface 165A of the light guide 160 is such that the light 180B is reflected at a near-orthogonal angle, relative to the exit surface 190. However, the light 180G, striking the surface 165 at a higher elevation, having a steeper slope, is emitted at an angle that farther from the orthogonal of exit surface 190 than the light 180B; and the light 180R, striking at an even higher elevation, is emitted at an angle that is even further from the same orthogonal.

On the side surface 165B, on the other hand, the opposite effect is produced. Light 185R is reflected at a near-orthogonal angle, while light 185B is reflected far off the orthogonal.

One of skill in the art will recognize that curvature of the sides 165A, 165B may be shaped differently, and a different optical effect will be produced. For example, the sides 165A, 165B may be shaped such that the light 180G, 185G from the center of the array is reflected at an orthogonal, or near orthogonal angle, rather than the light 180B striking side 165A and 185R striking side 165B, but this adjustment will only cause the light 180B and 185R to be reflected at an angle that is significantly off the orthogonal. In practice, the curvature (parabolic characteristics) are selected such that this non-uniform (different angles of reflection for different colors) is least noticeable, or least objectionable.

The overall effect of the non-uniform reflection pattern of FIG. 1B is that on the left side of the light emitting surface 190, very little light 185B from the blue light source 101B will exit the surface 190 at an orthogonal angle, while substantially more light 185R from the red light source 101R will exit the surface 190 at an orthogonal angle. On the right side of the light emitting surface 190, very little light 180R from the red light source 101R will exit at an orthogonal angle, while substantially more light 180B from the blue light source 101B will exit the surface 190 at an orthogonal angle. Light from the green light source 101G, on the other hand, will be symmetrically distributed across the left and right sides of the exit surface 190, albeit not orthogonal in this example.

This non-uniform distribution of the different colors and different emission angles of the colors presents a number of drawbacks, particularly in systems that are designed to provide a directional light output with a uniform mix of the colors, such as a system that produces a directional white light output. Viewed from an orthogonal direction, the right side of the surface 190 is likely to appear more blue than the left side, and the left side of the surface 190 is likely to appear more red than the right side. As the viewing angle changes, the intensity of the off-orthogonal light on one side will appear to increase while the intensity of the off-orthogonal light on the other side will appear to decrease.

It is significant to note that this non-uniform distribution of colors and emission angles is primarily caused by the optics 160 used to provide a directional, collimated light output. In an application that provides non-directional lighting, such as a retrofit light bulb having a wide field of illumination, the Lambertian light output from each of the light sources of different color naturally overlap each other, and will provide a similarly perceived output regardless of the angle of view.

In like manner, if each of the light sources were of the same color, or the different color sources were sufficiently randomly distributed on the substrate, or the different colors struck the input surface of the light guide 160 in a random manner, the different patterns of reflection on each side 165A, 165B of the light guide 160 would be immaterial, other than being a cause of an increased beamwidth compared to a truly collimated light output.

Figure 2:
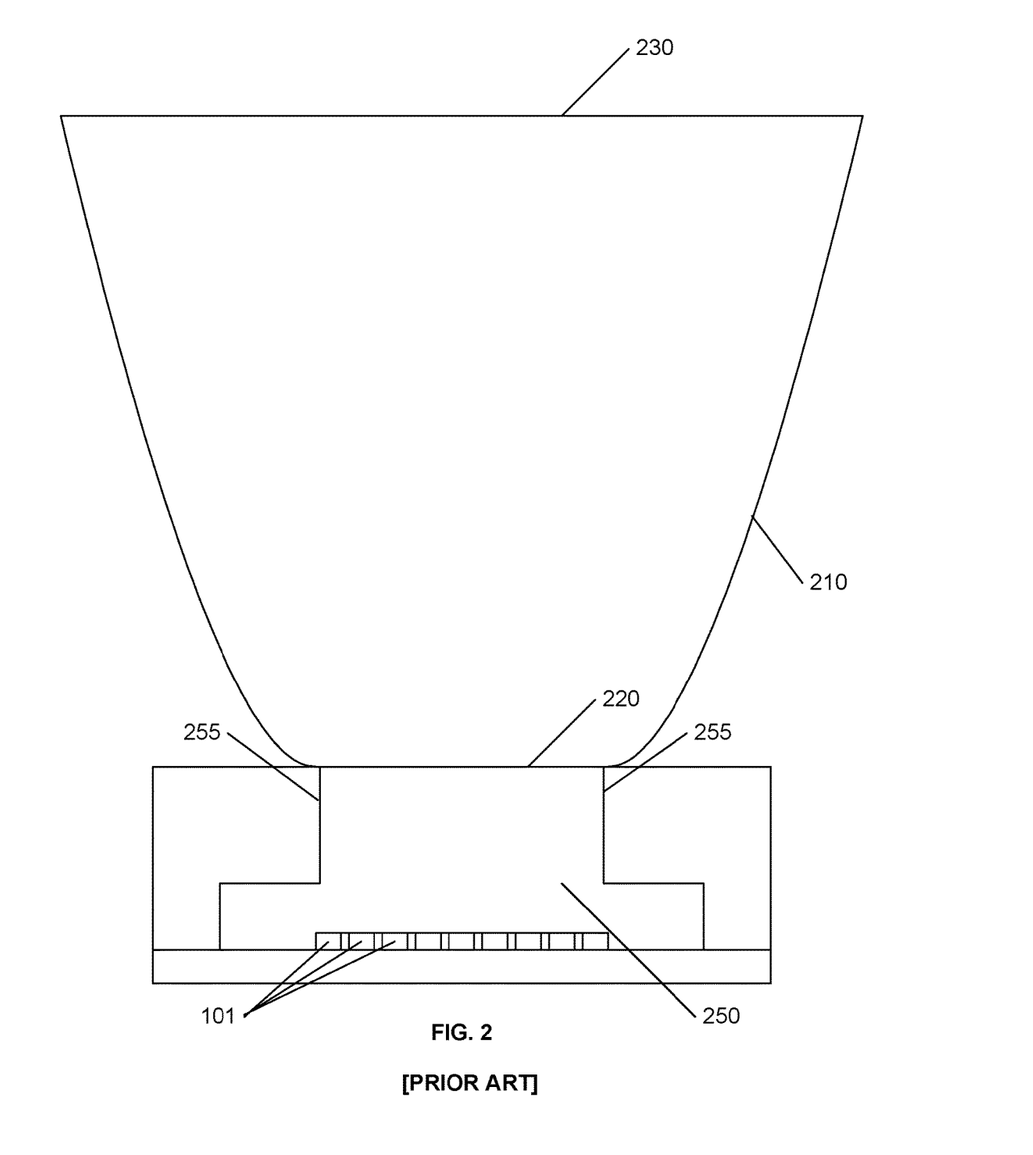
FIG. 2 illustrates a convention color mixing element situated between the light emitting sources and the parabolic reflector.

USP 2012/0069547 published for Gielen et al. on 22 Mar. 2012, provides a color-mixing optical element 250 situated between the light sources 101 and the parabolic reflector 210, as illustrated in FIG. 2. Light that is emitted from the light sources 101 at angles substantially off from orthogonal is reflected from the walls 255 of the color mixing element 250, increasing the likelihood that the light emitted from any particular light source 101 will exit the surface 220 and strike the walls 215 of the reflector 210 in a more randomly distributed pattern, thus producing a more uniform light output from the light emitting surface 230. Although light from the left and right sides of the surface 220 will be reflected differently from the walls 255 than light from the center of the surface 220, the particular color or pattern of the light from each side is more random, producing less of a color-specific non-uniformity on the surface 230.

SUMMARY OF THE INVENTION

It would be advantageous to provide a high brightness light source comprising a mix of different color light outputs. It would also be advantageous to provide a high efficiency color mixing optic to provide this high brightness light source.

To better address one or more of these concerns, in an embodiment of this invention, a mixing optic is provided that combines a variety of features to enhance the brightness and uniformity of the light emitted from a combination of different color light emitting sources. The mixing optic may include a parabolic reflector that redirects low-angle emissions, a reflective waveguide that mixes the light spatially, and a diffuser plate that mixes the light angularly. In an embodiment, the output of the mixing optic exhibits a substantially Lambertian output pattern of a substantially uniform mix of colors, exhibiting, for example, the light output pattern of a single white light source.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

In the following description, the term 'white' light output is used to define a desired combination of the multi-color light sources, because white light is typically the most commonly desired composite color combination. One of skill in the art will recognize that if a different composite color combination is desired, the principles of this invention will apply. That is, the choice of particular colors for the light sources, the ratios of intensities among the light sources, and so on, may be determined independent of this invention, and this invention is substantially independent of such a choice.

A disadvantage of the prior-art color mixing element illustrated in FIG. 2 is that light that is emitted at shallow angles relative to the surface of the light emitting elements 101 is either trapped within the mixing element 250, or experiences a large number of reflections before it strikes the surface 220. The likelihood of optic loss increases with each reflection, thereby diminishing the light output from the mixing element 250 for shallow angle light. Additionally, the rectilinear shape of the mixing element 250 introduces a symmetry such that shallow angled light will likely strike the surface 220 at the same shallow angle and be totally internally reflected at the surface 220. Assuming that the emissions from the light emitting sources 101 are Lambertian in nature, even the loss of only the shallowest 10% of the emitted light (e.g. light emitted between 81 and 90 degrees) will result in a 10% loss of light output, and the aforementioned losses due to repeated reflections will further increase this loss.

Figure 3:
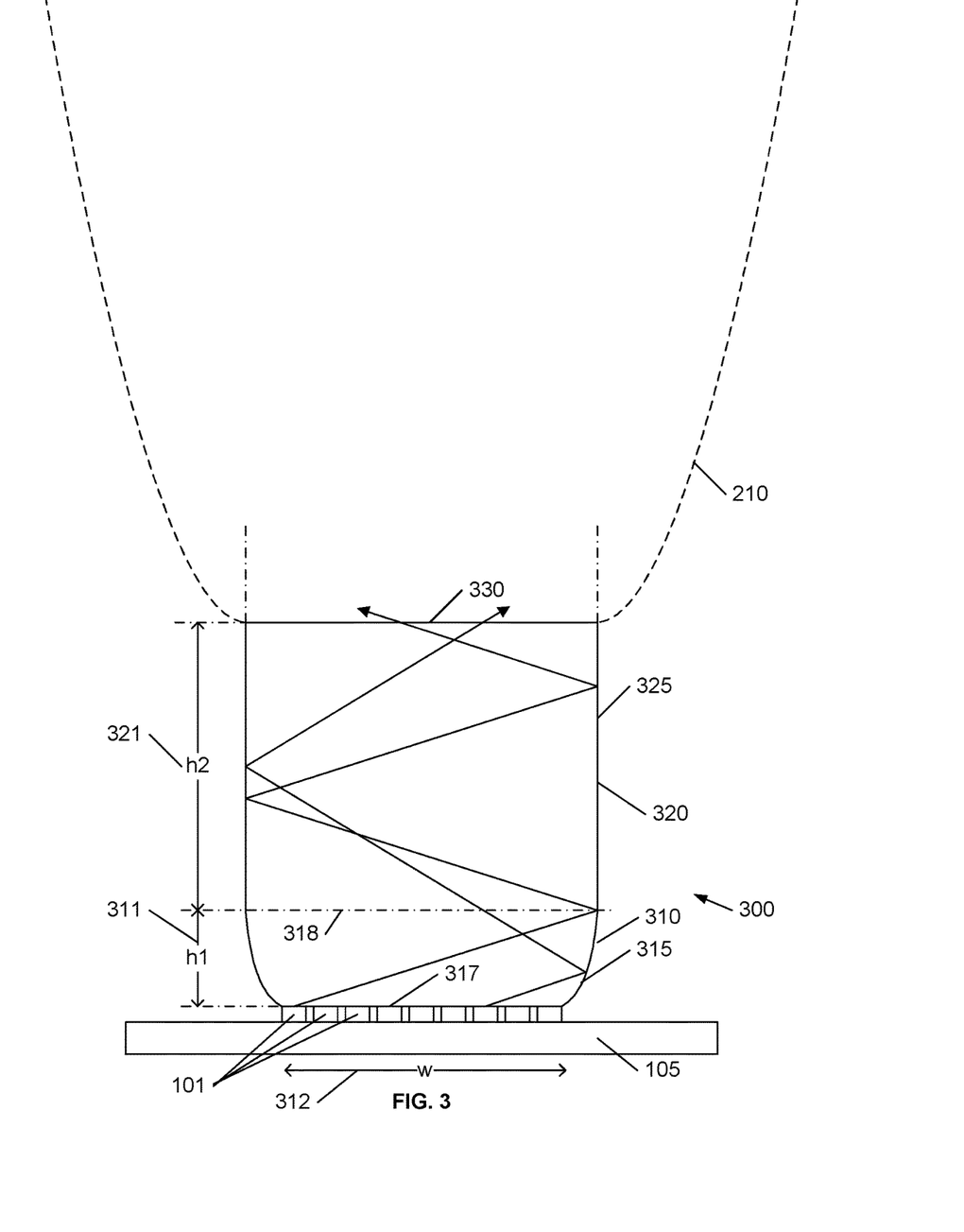
FIG. 3 illustrates an example color mixing optic comprising a parabolic reflector and a light guide.

FIG. 3 illustrates an example color mixing optic 300 comprising a parabolic reflector 310 and a light guide 320, the interface between the two being indicated by the dot-dashed line, corresponding to an exit surface 318 of the parabolic reflector 310.

A lower portion of the mixing optic 300 is shaped to provide sidewalls 315 that are parabolic, forming the compound parabolic reflector 310. In an example embodiment, the parabolic reflector 310 has an input angle of 75°, and an output angle of 90°, and serves to reflect and redirect light that is emitted at shallow angles relative to the surface of the light sources 101. The input angle may range between 65° and 75°, and the output angle may range between 80° and 90°, although other ranges may be used, depending upon the amount of redirection desired.

By increasing the angle of the reflected light relative to the surface of the light emitting elements 101, the number of reflections of the light emitted at shallow angles is substantially reduced, and the likelihood of the light being totally internally reflected at the exit surface 330 is also reduced.

The overall size of the optic 300 may be dependent upon the size of the array of light sources 101, which is typically arranged in a square pattern. The size of the input surface 317 of the parabolic reflector 310 is configured to accommodate this array without being much larger than the array of light sources 101 (e.g. see FIGS. 4B, 4C). Nominally, the height h1 311 of the parabolic reflector may be about a quarter of the width w 312 of the input surface 317, depending upon the desired amount of redirection. The height h1 311 may range from 0.15 to 0.40 of the width w 312, although shorter and taller heights may be used.

An upper portion of the mixing optic 300 is shaped as a light guide 320, with sidewalls 325 that are substantially orthogonal to the exit surface 318 of the parabolic reflector 310. Because the walls are substantially orthogonal to the exit surface 318, and thus orthogonal to the surface of the light sources 101, the angle of the light that is reflected from the sidewalls 325 will generally equal the angle of the light emitted from the light sources 101. Accordingly, the light that strikes the surface 330 will exhibit a substantially Lambertian pattern, with the exception of the shallow angled light from the light sources 101 that is redirected by the parabolic reflector 310.

It should be noted that, for ease of presentation and understanding, the term 'walls' as used herein may include a single wall, such as the continuous wall of a cylindrical structure extending between the 'top' and 'bottom' of the cylinder. Also, the term 'surface' as used herein may include a discrete interface between adjoined elements, or an imaginary interface between identified components of a common structure. For example, if differently shaped components of a structure are formed using a common material, such as by molding the composite structure, the plane of material between the differently shaped components forms a 'surface' between these elements.

The amount of mixing that occurs, i.e. the range of emission angles that will cause a reflection from the sidewalls 325, will be dependent upon the height h2 321 of the waveguide 320 relative to the width w 312 of the input surface 317 of the parabolic reflector 310, assuming that the size of the array of light sources 101 is approximately the size of the input surface 317. A height h2 321 of 0.75-3 times the width 312 of the input surface 317 is generally sufficient to provide a uniform mix of color and incident angles on the surface 330, although other heights may be used, depending upon the particular uniformity requirements and the particular distribution of colors within the array of light sources 101 on the substrate 105.

Another parabolic reflector 210 is illustrated in dashed lines in FIG. 3. This parabolic reflector 210 receives the composite light output from the surface 330. Because the light output from the surface 330 is substantially Lambertian, the reflector 210 may be designed to optimize the collimation of the light from the reflector 210.

Although the light that is emitted from the different points on the surface 330 will be reflected by the reflector 210 differently from light emitted from the center of the surface 330, the substantially Lambertian pattern of the light from the surface 330 allows for the reflector 210 to be designed to provide a substantially uniform light output intensity. Additionally, the color mixing provided by the light guide 320 may substantially eliminate discernible color-specific patterns across the surface 330.

Effectively, from the perspective of the parabolic reflector 210, the optic 300 appears as a white light source having a substantially Lambertian output pattern. That is, the combination of the optic 300 and the light sources 101 provide an output pattern that might be produced by a light emitting element that emits white light directly.

Figure 4A:
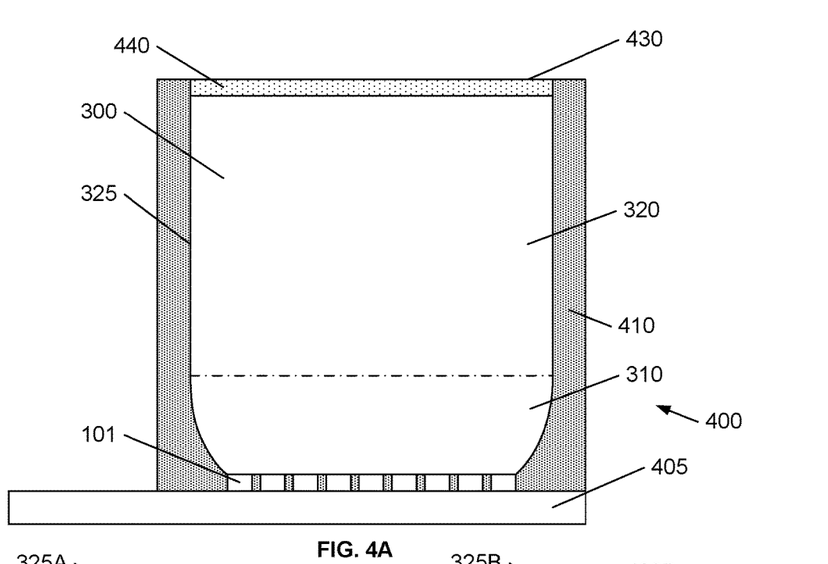
FIGS. 4A-4C illustrate an example embodiment of an example white light source having a substantially Lambertian output pattern of uniform color.
Figure 4B:
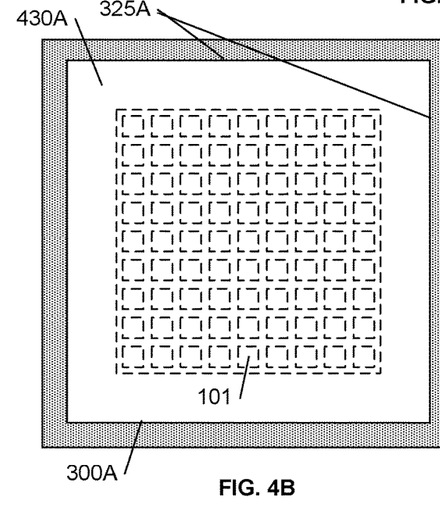
Figure 4C:
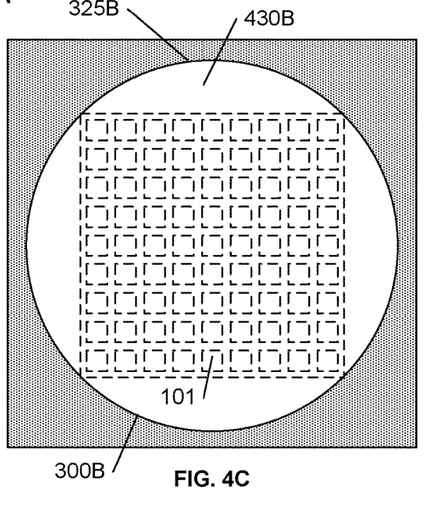

FIGS. 4A-4C illustrate an example embodiment of an example white light source having a substantially Lambertian output pattern of uniform color. FIG. 4A illustrates a profile cross-section of a light source 400, and FIGS. 4B and 4C illustrate the top views of differently shaped structures of the light source 400.

In this embodiment, the mixing optic 300 is packaged within a structure 410 to form an integral white light source 400 that can be incorporated within lighting devices such as spotlights, camera flashes, backlights, and so on. To facilitate handling, the structure 410 may be rectilinear.

A substrate 405 may include conductive strips (not illustrated) that interconnect the light sources 101 and/or facilitate coupling of the device 400 to a source of external power. In the example illustrated, the substrate 405 extends laterally beyond the device 400, and may include contacts to the conductive strips upon the upper and/or lower surface of the substrate 405 in this extended portion. Alternatively, the substrate 405 may be the same width as the device 400, with contacts to the conductive strips on the bottom of the substrate 405, below the device 400. Such an arrangement facilitates the formation of an array of immediately adjacent devices 400.

The mixing optic 300 may be a discrete block of transparent material, or it may merely be a hollow cavity in the structure 410. The parabolic reflector 310 and lightguide 320 of the mixing optic 300 may be formed as a single composite, or as discrete elements that are bonded together. One or both of the parabolic reflector 310 and the lightguide 320 may be a hollow cavity within the structure 410.

The exterior of the mixing optic 300 may be coated with a reflective material, and/or the structure 410 may be reflective, and/or the indices of refraction of the material of the optic 300 and the structure 410 may be selected to provide total internal reflection across a wide range of incidence angles. For ease of reference, the phrase 'reflective surface' is used herein to identify a surface from which most or all of the light emitted from the light sources 101 is reflected, regardless of the particular scheme(s) used to achieve this reflection.

The choice of material for the mixing optic 300 may be dependent upon the material of the lighting device in which the device 400 will be used, and the respective indices of refraction and other characteristics. In some embodiments, the material for the mixing optic may be the same as the material that will be used in the lighting device, or it may be an interface material that facilitates the efficient coupling of light from the light sources 101 to the material in the lighting device. If the material of the optic 300 is other than air, the structure 410 may be used as a mold to form the optic 300; if the optic 300 is pre-formed, the structure 410 may be molded around it.

To further enhance the Lambertian characteristics of the optic 300, a diffusion layer 440 may be included. When a light ray strikes the diffusion layer 440, a plurality of light rays may be emitted by the diffusion layer 440, with varying angles of emission, depending upon the particular characteristics of the diffusion layer 440. Although there may be some back-scattering produced by the diffusion layer 440, a substantial majority of the light striking the diffusion layer 440 is likely to be emitted from the exit surface 430.

The optic 300 may have any of a variety of shapes, FIGS. 4B and 4C illustrating two potential shapes as viewed from the top of the device 400.

In FIG. 4B, the walls 325A of the optic 300 may be orthogonal to each other, providing for a rectangular light output surface 430A. The parabolic reflector 310 (not illustrated in FIG. 4B) in this example may be formed as a complex reflector with a rectangular perimeter that narrows in the direction toward the light emitting sources 110 and a smooth transition at each vertex of the light guide formed by walls 325A and the array of light emitting elements 101, or it may be formed so as to produce a compound-miter-like edge at each vertex.

In FIG. 4C, the walls 325B of the lightguide 320 form a cylindrical structure with a light output surface 430B centered on the array of light sources 101. In this example, the optic 300 may be bullet-shaped, with the parabolic reflector 310 being formed as a cylinder with decreasing diameter in a direction toward the light sources 101.

Figure 5A:
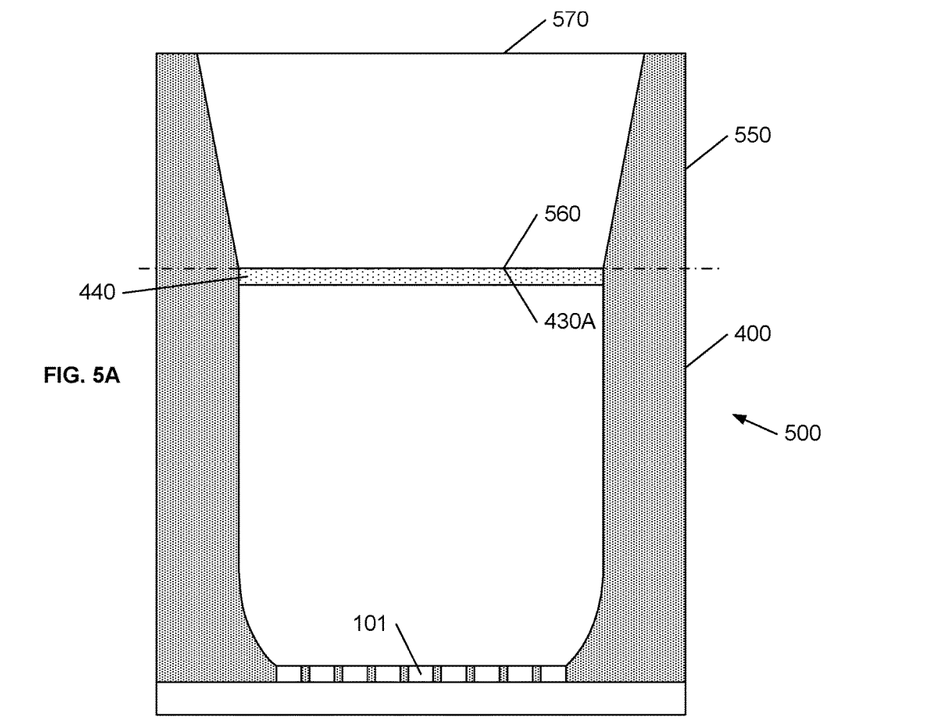
FIGS. 5A-5B illustrate an example embodiment of an example white light source with a loft element that converts a rectangular light output pattern to a circular light output pattern.
Figure 5B:
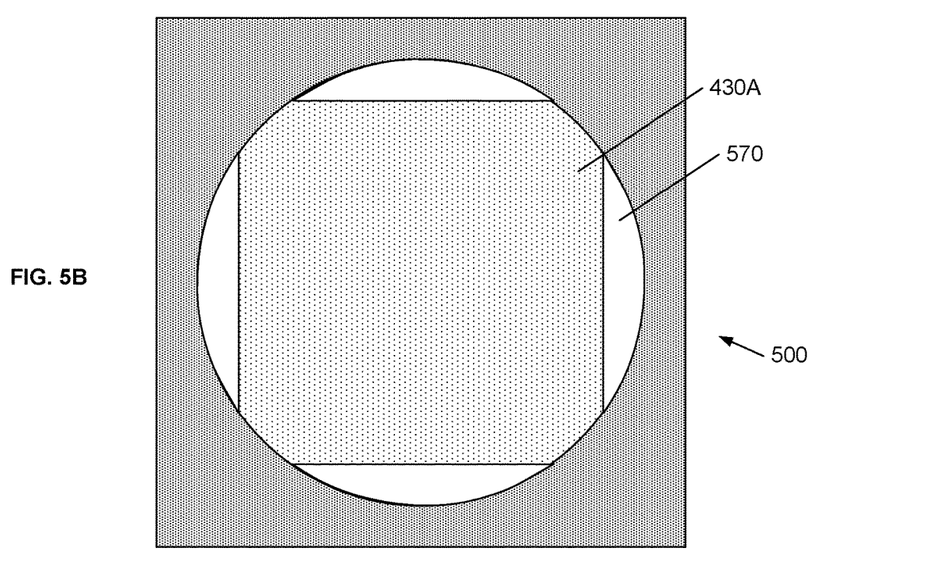

FIGS. 5A-5B illustrate an example embodiment of an example white light source 500 with a loft element 550 above a light source 400. The loft 550 converts a rectangular light output pattern of the light source 400 (as illustrated in FIG. 4A-4B) to a circular light output pattern.

A rectangular light output surface 430A, such as illustrated in FIG. 4B, may be the easier (less costly) pattern to provide than a circular light output pattern, or it may be the more frequently desired light output pattern. The loft element 550 is provided to allow for the production of a mixing optic 400 with a rectangular output surface 430A, while also satisfying a demand for a mixing optic 500 that provides a circular output surface 570.

The loft element 550 includes an input aperture 560 that receives the light provided by the rectangular light output surface 430A of the device 400. The input aperture 560 may be at least as great as the light output surface 430A, so that all the light from the optic 400 is provided to the loft 550. To provide a continuous wall surface, the light input aperture 560 may be the same size as the light output surface 430A.

The light emitting surface 570 of the loft 550 may be circular, with an area that is equal to the area of the light output surface 440. The area of the circle may be smaller or larger, in the event that a more concentrated or more dispersed (respectively) output pattern is desired; however, optical losses are usually minimized when the area of the light emitting surface is equal to the area of the light output surface 440.

The loft 550 may be formed using a continuous transition from the rectangular shape of the light output surface 440 to the circular light output surface 440, akin to "morphing" a rectangle into a circle in three dimensions. A slow transition from rectangular to circular light output provides for minimal optical loss. In an example embodiment, the height of the loft 550 may be between half and twice the width of the array of light sources 101, although other heights may be used, depending upon the acceptable degree of loss in the transition from a rectangular to circular beam pattern.

Although the light source 500 is illustrated with the diffusion element 440 at the transition between the mixing optic 400 and the loft 550, one of skill in the art will recognize that the diffusion element 440 may be a circular diffusion element at the light emitting surface 570 of the loft 550.

Because the light emitted from the light output surface of the optic 400 is substantially Lambertian, even without the diffusion element 440, the output from the loft 550 of the device 500 can be expected to be Lambertian, with minimal color-specific characteristics, thereby providing an output that is comparable to the light output pattern of a surface of a light source that provides a white output directly.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein one or more wavelength conversion elements are included in the mixing optic. Because the light emission pattern of a conventional wavelength conversion element provides a Lambertian output of the wavelength converted light on both surfaces of the wavelength conversion element, it may be situated at any elevation within the mixing optic including at the aperture. A dichroic filter may be used to reflect the 'downward' emissions from the wavelength conversion element upward.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An optical mixer comprising:
   a compound parabolic reflector with an input surface that receives light from a light source, and
   a lightguide coupled to the compound parabolic reflector wherein a least one wall of the lightguide is substantially orthogonal to an exit surface of the compound parabolic reflector;
   wherein:
   a height of the walls of the lightguide is at least as large as 0.75 times a width of the input surface of the compound parabolic reflector,
   the compound parabolic reflector has an input angle between 65° and 75°, and an output angle between 80° and 90° to redirect light emitted at shallow angles relative to a surface of the light source; and
   at least a portion of the light received at the input surface of the compound parabolic reflector is reflected by the compound parabolic reflector, into and through the lightguide, to be emitted from an exit surface of the optical mixer.

2. The optical mixer of claim 1, wherein the height of the lightguide is less than three times the width of the input surface.

3. The optic mixer of claim 1, wherein a height of the compound parabolic reflector is between 0.15 and 0.40 times the width of the input surface.

4. The optical mixer of claim 1, wherein the optical mixer is a monolithic transparent medium.

5. The optical mixer of claim 1, wherein one or both of the compound parabolic reflector and the lightguide is a solid transparent medium.

6. The optical mixer of claim 1, wherein one or both of the compound parabolic reflector and the lightguide is a hollow optic.

7. The optical mixer of claim 1, including the light source.

8. The optical mixer of claim 1, including a diffusion element that is situated between the lightguide and the exit surface of the optical mixer.

9. The optical mixer of claim 1, wherein the exit surface of the optical mixer is rectangular.

10. The optical mixer of claim 1, wherein the exit surface of the optical mixer is circular.

11. The optical mixer of claim 1, wherein an exit surface of the lightguide is rectangular.

12. The optical mixer of claim 11, including a loft element that receives light from the rectangular exit surface of the lightguide and emits light from the optical mixer through a circular exit surface.

13. An optical mixer comprising:
    a compound parabolic reflector with an input surface that receives light from a light source, and
    a lightguide coupled to the compound parabolic reflector, wherein a least one wall of the lightguide is substantially orthogonal to an exit surface of the compound parabolic reflector;
    wherein:
    a height of the walls of the lightguide is at least as large as 0.75 times a width of the input surface of the compound parabolic reflector, and is less than three times the width of the input surface;
    a height of the compound parabolic reflector is between 0.15 and 0.40 times the width of the input surface of the compound parabolic reflector to redirect light emitted at shallow angles relative to a surface of the light source; and
    at least a portion of the light received at the input surface of the compound parabolic reflector is reflected by the compound parabolic reflector, into and through the lightguide, to be emitted from an exit surface of the optical mixer.

14. The optical mixer of claim 13, wherein the optical mixer is a monolithic transparent medium.

15. An optical mixer comprising:
    a compound parabolic reflector with an input surface that receives light from a light source, and
    a lightguide coupled to the compound parabolic reflector, wherein a least one wall of the lightguide is substantially orthogonal to an exit surface of the compound parabolic reflector;
    wherein:
    the compound parabolic reflector has an input angle between 65° and 75°, and an output angle between 80° and 90° to redirect light emitted at shallow angles relative to a surface of the light source,
    a height of the compound parabolic reflector is between 0.15 and 0.40 times a width of the input surface of the compound parabolic reflector, and
    at least a portion of the light received at the input surface of the compound parabolic reflector is reflected by the compound parabolic reflector, into and through the lightguide, to be emitted from an exit surface of the optical mixer.

* * * * *